Dec. 18, 1956  H. FIEVET  2,774,373
SAFETY VALVE, NOTABLY FOR HYDROCARBON RESERVOIRS AND PIPINGS
Filed Jan. 24, 1955
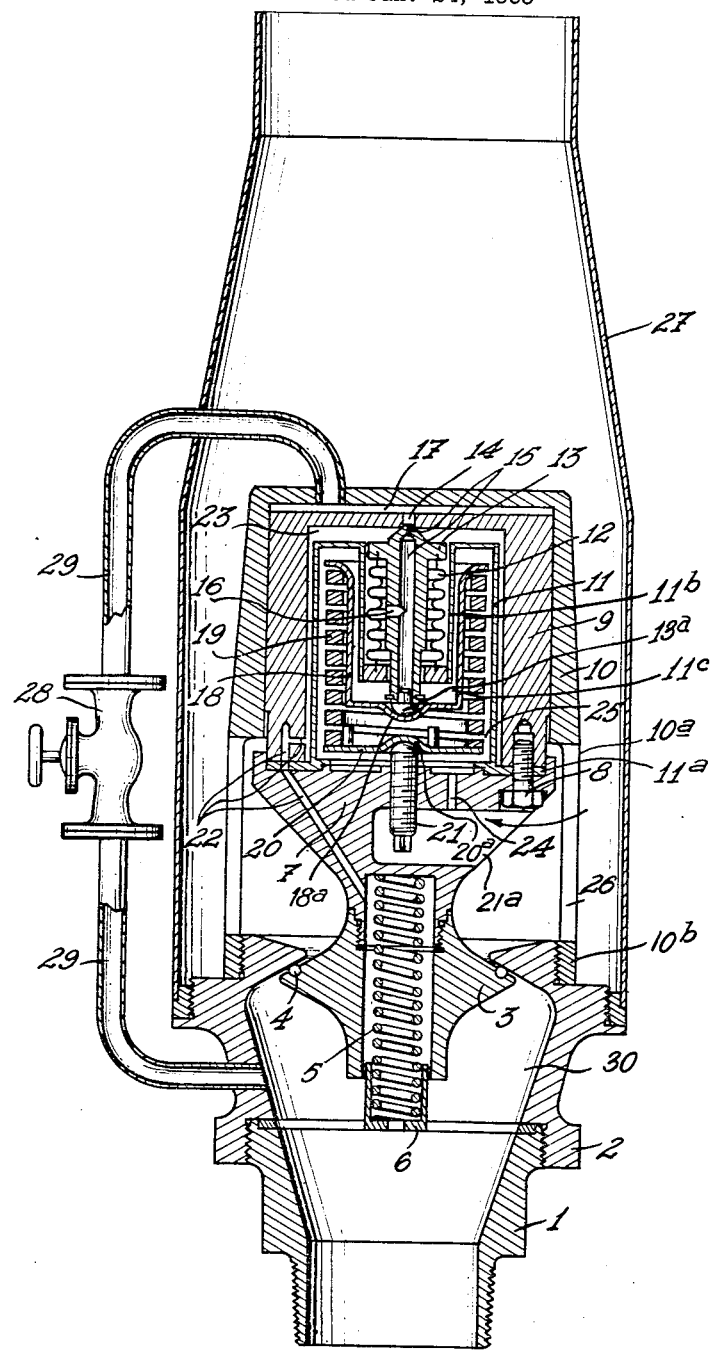

United States Patent Office 2,774,373
Patented Dec. 18, 1956

2,774,373

SAFETY VALVE, NOTABLY FOR HYDROCARBON RESERVOIRS AND PIPINGS

Henri Fievet, Sens, France, assignor to Societe Technique et Commerciale d'Installations Industrielles Luceat, Sens (Yonne), France Application January 24, 1955, Serial No. 483,583

Claims priority, application France January 30, 1954

7 Claims. (Cl. 137—490)

This invention relates in general to valves and more particularly to a safety valve notably for equipping installations such as reservoirs and pipe lines containing or circulating high vapor-pressure substances such as hydrocarbons, volatile oils, butane, gasoline, propane, in either liquid or gaseous form.

It is known that the storage and handling of these products require plants incorporating means adapted on the one hand to enable the gases or liquids to be vented to the atmosphere when the pressure thereof reaches a value critical for the installation, and on the other hand to allow atmospheric air to penetrate into the installation when a similarly critical reduction in pressure occurs therein.

Apparatus answering this twofold purpose are already known. They are either provided with preloaded valves or designed to include flexible plastic diaphragms. However, these known safety apparatus offer serious drawbacks; the first-mentioned type is inaccurate and does not afford a positive opening of the valve means therein; the other type is unable to withstand high temperatures and/or pressures, and besides it is easily attacked by certain corrosive or solvent products.

It is the essential object of this invention to avoid these drawbacks by providing a valve characterized in that it can be manufactured completely from suitable materials such as stainless steels, aluminum-bronze, lead or other similar materials.

According to this invention, the valve assembly comprises a single valve member actuated from a piston movable in a stationary cylinder, this piston incorporating the responsive members constituting the pilot- or servo- device controlling the apparatus, and the valve member is releasable when the pressure attains on the one hand a predetermined uppermost value and on the other hand an also predetermined lowermost value.

The single figure of the attached drawing forming part of this specification illustrates diagrammatically and in section, by way of example, a preferred form of embodiment of the invention, in order to afford a better understanding of the various features and advantages of the device of this invention.

In this form of embodiment the valve and its control means are connected to the installation to be protected through a pipe fitting 1 formed with the usual screw-threaded portion adapted to engage the correspondingly screw-threaded end of the pipe or like conduit leading to and from the installation to be protected. Secured on this fitting 1 through a similar screw connection is a base member or valve-body 2 formed internally with a valve-box or chamber 30 containing the valve member proper 3 provided with its annular sealing gasket 4 bearing against a seat-forming portion of the inner wall of the valve-box 30. The torus-shaped valve gasket 4 may be made either of a suitable metal or of a material known under the registered trademark of "Teflon."

This valve member is seated when the pressure in chamber 30 exceeds the atmospheric value. Moreover, it is provided with an axial bore in which a compression coil spring 5 is mounted, as shown. This spring 5 bears at one end against cylindrical guide member 6 formed integrally with, or rigidly secured to, a spider-shaped element having its peripheral outer edge retained between mating surfaces of members 1 and 2, as shown. The valve member 3 is secured by screwing or the like to the lower portion 7 of a piston 9 carried by this lower portion and secured thereto by means of a plurality of screws 8 (of which only one is visible in the drawing). This piston 9 is surrounded and crowned by a blind cavity forming cylinder 10 having downwardly extending legs 10a formed integrally at their lower ends with an internally screw-threaded ring-shaped member 10b secured on an externally threaded portion of the support 2, as shown.

Inside this piston 9 is mounted a motor or relay unit enclosed in a cup-shaped casing 11. The outwardly extending bottom flange 11a of this casing is clamped in a fluid-tight manner between mating surfaces of the lower portion 7 and piston 9 by means of the aforesaid screws 8. The cup-shaped casing 11 is located with some clearance in the inner space of piston 9. The top face of casing 11 is formed with a central cylindrical pocket 11b formed in turn with a bottom face 11c on which a suitable metal bellows 12 is secured in a fluid-tight manner. Through this bottom face 11c extends also with a certain clearance the hollow shank 13 of a needle valve having its head secured in fluid-tight relationship on the lower end of the bellows 12. This needle valve is adapted to obturate an orifice 14 formed in the head of the piston 9. Moreover, this needle valve is formed in turn with a gaged central bore 15 opening through the point of the needle, and the needle valve body 13 is formed with a radial orifice 16 to interconnect the inner space of bellows 12 with the central bore of the needle valve.

The shank of this needle valve engages through a dome-shaped insert 13a a correspondingly shaped cavity 18a formed centrally of a relatively deep cup-shaped member 18 surrounding the central cylindrical pocket 11b of the bottom face 11c of the cup-shaped casing 11. The upper edge of the cup-shaped member 18 is outflared and a compression coil spring 19 bears with one end against this edge and with its opposite end against a supporting disc 20 formed with centering studs or the like disposed internally of the spring 19. This disc 20 is also formed at its centre with a depression 20a registering with the rounded insert 13a and receiving the rounded head of an adjustment screw 21 extending partly through the lower portion 7 of the piston unit. Access to the operating end of this screw may be had when required through an aperture 21a provided laterally in the bottom member 7 of the piston unit.

The shank of the needle valve 13 extends with a sufficient clearance through the relevant perforation formed in the bottom face 11c supporting the bellows 12 to allow therethrough one of the fluids concerned. A duct 22 consisting of suitably disposed and registering perforations formed in the base 7, piston 9 and bottom flange 11a of cup-shaped casing 11, connects the cavity in the bottom member 7 in which the spring 5 is located (this cavity being in fluid connection with the valve-box in members 1 and 2, as already explained) with the clearance 23 between the wall of the inner space of piston 9 and the outer wall of the cup-shaped member 11. The bottom member 7 of the piston unit is also formed with a perforation 24 through which the chamber 25 in the casing 11 is constantly communicating with the outer atmosphere, as this perforation 24 leads into the cavity 21a in which the adjustment screw 21 may be actuated, this cavity communicating in turn with the atmosphere through the relatively large apertures 26 left between the legs 10a of cylinder 10, in those cases where it is desired to connect a capacity under pressure with the outer atmosphere, as in the example illustrated in the drawing.

The complete assembly described hereinabove may be enclosed in a complementary housing 27 for the sole purpose of directing the exhausted fluids in the desired direction.

Moreover, a pipe 29 is provided which connects directly the valve-box or chamber formed in members 1 and 2 to the chamber 17 formed between the piston head 9 and the bottom of cylinder 10, a suitable valve 28 being inserted in this pipe, as shown.

The above-described safety valve operates as follows:

When the installation to be protected is not under pressure, the valve member 3 is seated, thereby preventing any escape of fluid due to the pressure exerted by the spring 5 counteracting the weight of the movable assembly. When the pressure in the chamber 30 formed in the members 1 and 2 and beneath the valve member 3 increases, this chamber communicating directly with the installation to be protected, this pressure is transmitted to the valve member and assists in seating the latter.

This pressure is transmitted to the chamber 23 through the duct 22; it tends to compress the bellows 12 since the inner space thereof communicates with the atmosphere through the chamber 25 and cavity 24. The force thus exerted is opposed to that exerted by the spring 19 previously calibrated and adjusted by means of the adjustment screw 21. When the inner pressure of the installation exceeds a predetermined value, the needle valve 13 rigid with the upper end of the bellows 12 is moved downwardly and opens the orifice 14 connecting the chamber 17 to the inner space 30 in members 1 and 2. Then this pressure acts upon the piston head 9 having a larger cross-sectional area than that measured across the valve seat. As the resulting force becomes preponderant, the piston 9 is moved downwardly and this movement is followed by the complete piston, relay and valve assembly. The valve member 3 is thus positively opened and vents to the atmosphere, through the ports 26 and housing 27, the controlled fluid.

When the pressure in members 1 and 2 is reduced, the pressure in chamber 23 decreases similarly and when its value becomes lower than said predetermined value, the bellows 12 resumes its initial position and reseats the needle-valve 13 engaging the seat-forming edge of the orifice 14. The pressure fluid in chamber 17 is exhausted through the gaged orifice 15 connecting this chamber to the atmosphere through the inner duct formed in the needle valve proper, the inner space of the bellows 12, the clearance between the shank of this needle valve and the bellows supporting guide 11c, the space 25 and the duct 24. This gaged orifice 15 is calculated to cause the leak produced when the needle valve is opened to be considerably lower than the input fluid circulating in the duct 22, so that the chamber 17 will remain under pressure when the needle valve is opened.

Due to the venting of space 17 to the atmosphere the movable assembly subjected to the combined action of the pressure exerted on the lower face of the valve member 3 and of the spring 5, will commence its upward movement until the valve member 3 is closed and then the cycle described hereinabove may be resumed.

The only purpose of the screw 21 is to complete the pre-adjustment or gaging by acting upon the disc 20 to compress or expand the spring 19.

When the pressure exerted on the lower face of the valve member 3 falls below a predetermined lowermost limit-value, the residual force resulting from the balance between the calibration of spring 5 and the weight of the movable assembly, to which the action of the atmospheric pressure exerted on the same valve member 3 is added, will become greater than the supporting force exerted on the valve member 3 from below. Under these conditions the valve member 3 will unseat and atmospheric air will be admitted into the installation, thereby restoring the conditions of balance required for the installation concerned.

Considering the safety factor of the device of this invention, in case of failure of the adjustment bellows 12 both chambers 23 and 25 would be subjected to the same pressure. The output of duct 22 is considerably greater than the permissible output flowing through the orifices 24 and 15. The pressure in chamber 23 is transmitted to chamber 17 and opens the valve member 3 permanently. No other safety means are required for the operation of the device under depression conditions since a failure of the bottom or valve spring 5 would only reduce the risk.

Consequently, this valve is adapted to operate intermediate two chambers subjected to different pressures, according to the conditions fixed by the preadjustments. It is also adapted to operate as a quick-opening valve. When the by-pass valve 28 is opened, the pressure in the installation to be protected is transmitted immediately through the pipe 29 to the chamber 17. Besides, this valve 28 may serve as a means for checking the proper operation of the valve member. When this checking is desirable the valve 28 may consist of a push-button cock.

Of course, anybody conversant with the art will readily appreciate that many modifications and alterations may be brought to the single and preferred form of embodiment illustrated and described herein, without departing from the spirit and scope of the invention, as disclosed in the appended claims.

What I claim is:

1. A safety valve disposed between two rooms each of which contains a gaseous fluid under pressure, comprising, in combination, a valve assembly having a substantially tubular valve-body secured on the wall separating the rooms and formed with a valve-seat facing a first room, a valve member part of which faces the second room, a spring applying said valve member against said valve-seat as long as the fluid pressure in said first room remains between two predetermined limits, a cylinder with a closed end secured on said valve-body and located within the second room, a hollow differential piston having a head end and an open end and being slidably mounted in said cylinder to define a chamber therewith and secured on the part of said valve member facing said second room, said hollow piston defining an inner cavity, means for separating the inner cavity of said hollow piston from the second room, means for connecting said inner cavity to said first room, pressure responsive means for connecting said chamber to said cavity in response to the fluid pressure in the first room attaining the upper limit whereby the valve assembly is instantaneously opened, pressure responsive means for connecting said chamber exclusively to the second room in response to the falling of the fluid pressure in the first room under said upper limit whereby the valve assembly is instantaneously closed, and means for opening the valve assembly in response to the fluid pressure in said first room falling under the lower limit, said piston being formed with ducts respectively connecting its inner cavity to the first and second rooms, said piston being formed with an orifice through its head end, the pressure responsive means for connecting the chamber to said cavity comprising a needle valve housed in said piston and closing said orifice, a deformable bellows housed in said piston, operatively connected to said needle valve, and having its outer face submitted to the fluid pressure in the first room through the ducts connected to the first room, the inner face of the bellows being submitted to the fluid pressure in the second room through the ducts connected to the second room, means for separating the two spaces defined by said bellows in the piston cavity, and adjustable means for resiliently applying said needle valve against the piston bottom.

2. A safety valve disposed between two rooms each of which contains a gaseous fluid under pressure, comprising, in combination, a valve assembly having a substantially tubular valve-body secured on the wall separating the rooms and formed with a valve-seat facing a first room, a valve member part of which faces the second room, a spring applying said valve member against said valve-seat as long as the fluid pressure in said first room remains between two predetermined limits, a cylinder with a closed end secured on said valve-body and located within the second room, a hollow differential piston having a head end and an open end and being slidably mounted in said cylinder to define a chamber therewith and secured on the part of said valve member facing said second room, said hollow piston defining an inner cavity, means for separating the inner cavity of said hollow piston from the second room, means for connecting said inner cavity to said first room, pressure responsive means for connecting said chamber to said cavity in response to the fluid pressure in the first room attaining the upper limit whereby the valve assembly is instantaneously opened, pressure responsive means for connecting said chamber exclusively to the second room in response to the falling of the fluid pressure in the first room under said upper limit whereby the valve assembly is instantaneously closed, and means for opening the valve assembly in response to the fluid pressure in said first room falling under the lower limit, said piston being formed with ducts respectively connecting its inner cavity to the first and second rooms and with an orifice through its head end the connecting pressure responsive means comprising a needle valve housed in said piston and closing said orifice, a deformable bellows housed in said piston, operatively connected to said needle valve, and having its outer face submitted to the fluid pressure in the first room through the ducts connected to the first room, the inner face of the bellows being submitted to the fluid pressure in the second room through the ducts connected to the second room, means for separating the two spaces defined by said bellows in the piston cavity, and adjustable means for resiliently applying said needle valve against the head end of the piston, said needle valve being formed with an inner duct communicating with the inner space of the bellows and in its pointed end with a gaged orifice communicating with said inner duct.

3. A safety valve disposed between two rooms each of which contains a gaseous fluid under pressure, comprising, in combination, a valve assembly having a substantially tubular valve-body secured on the wall separating the rooms and formed with a valve-seat facing a first room, a valve member part of which faces the second room, a spring applying said valve member against said valve-seat as long as the fluid pressure in said first room remains between two predetermined limits, a cylinder with a closed end secured on said valve-body and located within the second room, a hollow differential piston having a head end and an open end and being slidably mounted in said cylinder to define a chamber therewith and secured on the part of said valve member facing said second room, said hollow piston defining an inner cavity, means for separating the inner cavity of said hollow piston from the second room, means for connecting said inner cavity to said first room, pressure responsive means for connecting said chamber to said cavity in response to the fluid pressure in the first room attaining the upper limit whereby the valve assembly is instantaneously opened, pressure responsive means for connecting said chamber exclusively to the second room in response to the falling of the fluid pressure in the first room under said upper limit whereby the valve assembly is instantaneously closed, and means for opening the valve assembly in response to the fluid pressure in said first room falling under the lower limit, said piston being formed with ducts respectively connecting its inner cavity to the first and second rooms and with an orifice through its head end the connecting pressure responsive means comprising a needle valve housed in said piston and closing said orifice, a deformable bellows housed in said piston, operatively connected to said needle valve, and the bottom of which defines a clearance with the shank of the needle valve which extends therethrough, said bellows having its outer face submitted to the fluid pressure in the first room through said clearance and the ducts connected to the first room, the inner face of the bellows being submitted to the fluid pressure in the second room through the ducts connected to the second room, means for separating the two spaces defined by said bellows in the piston cavity, and adjustable means for resiliently applying said needle valve against the head end of the piston, said needle valve being formed with an inner duct communicating with the inner space of the bellows and in its pointed end with a gaged orifice communicating with said inner duct.

4. A safety valve, according to claim 3, further comprising an insert interposed between the valve member and the open end of the piston and formed with at least one duct interconnecting the piston cavity and the second room and with at least one channel connecting the first room to a duct formed in the piston and opening in the piston cavity, the cylinder being formed with legs connected to the valve-body.

5. A safety valve disposed between two rooms each of which contains a gaseous fluid under pressure, comprising, in combination, a valve assembly having a substantially tubular valve-body secured on the wall separating the rooms and formed with a valve-seat facing a first room, a valve member part of which faces the second room, a spring applying said valve member against said valve-seat as long as the fluid pressure in said first room remains between two predetermined limits, a cylinder with a closed end secured on said valve-body and located within the second room, a hollow differential piston having a head end and an open end and being slidably mounted in said cylinder to define a chamber therewith and secured on the part of said valve member facing said second room, said hollow piston defining an inner cavity, means for separating the inner cavity of said hollow piston from the second room, means for connecting said inner cavity to said first room, pressure responsive means for connecting said chamber to said cavity in response to the fluid pressure in the first room attaining the upper limit whereby the valve assembly is instantaneously opened, pressure responsive means for connecting said chamber exclusively to the second room in response to the falling of the fluid pressure in the first room under said upper limit whereby the valve assembly is instantaneously closed, and means for opening the valve assembly in response to the fluid pressure in said first room falling under the lower limit, said piston being formed with ducts respectively connecting its inner cavity to the first and second rooms and with an orifice through its head end, the connecting pressure responsive means comprising a cup-shaped casing located with some clearance in the cavity of the piston and secured on said piston in a fluid-tight manner for defining therewith two spaces the outer one of which is submitted to the fluid pressure in the first room through the ducts connected to the first room, the inner space being submitted to the fluid pressure in the second room through the ducts connected to the second room, a needle valve housed in the piston cavity, formed in its shank with an inner duct opening on the lateral surface of said shank and in its pointed end with a gaged port communicating with said inner duct, and closing said orifice, a deformable bellows one end of which is operatively connected to said needle valve while its other end is secured in a fluid-tight manner on the bottom of said cup-shaped casing which engages with a clearance the needle valve shank, and adjustable means for resiliently applying said needle valve against the head end of the piston.

6. A safety valve, according to claim 5, wherein the adjustable means for resiliently applying the needle valve comprises a cup-shaped member the bottom of which engages the free end of the needle valve shank and the upper end of which is outflared, a disc housed in the piston cavity, an adjustment screw engaging said disc and a compression spring the ends of which bear on said disc and the outflared part of said cup-shaped member, respectively.

7. A safety valve, according to claim 6, wherein the surface of the valve member submitted to the fluid pressure in the first room is so determined that the resulting pressure thereon when said fluid pressure falls down to the lower limit balances the pressure resulting from the action of the fluid pressure in the second room on said valve member, the compressive force exerted by the spring on said member and the weight of the movable assembly formed by the piston, the cup-shaped members, the spring, the disc, the needle valve and the bellows.

References Cited in the file of this patent

UNITED STATES PATENTS

| | | |
|---|---|---|
| 108,345 | Goll | Oct. 18, 1870 |
| 140,194 | Hague | June 24, 1873 |
| 715,707 | Tippett | Dec. 9, 1902 |
| 2,680,453 | Prijated | June 8, 1954 |